United States Patent [19]

Foulk

[11] 4,440,035

[45] Apr. 3, 1984

[54] SLIP CLUTCH SPEED CHANGE MECHANISM

[75] Inventor: Donald H. Foulk, Toledo, Ohio

[73] Assignee: Dana Corporation, Toledo, Ohio

[21] Appl. No.: 264,505

[22] Filed: May 18, 1981

[51] Int. Cl.³ .................... F16H 29/20; F16H 29/22
[52] U.S. Cl. .................................... 74/89.15; 464/46
[58] Field of Search .................. 74/89.15; 464/46

[56] References Cited

U.S. PATENT DOCUMENTS

| | | | |
|---|---|---|---|
| 2,337,902 | 12/1943 | Lakin | 74/89.15 |
| 2,398,841 | 4/1946 | Morris | 74/424.8 |
| 2,659,220 | 11/1953 | Cherry | 464/46 |
| 2,682,779 | 7/1954 | Stein et al. | 74/411 |
| 2,753,703 | 7/1956 | McIntyre | 464/46 X |
| 2,857,750 | 10/1958 | Fox | 64/30 |

Primary Examiner—Ernest R. Purser
Attorney, Agent, or Firm—Frank B. McDonald

[57] ABSTRACT

A speed change mechanism of the type incorporating a gear change yoke actuated by a travelling nut on a screw shaft has a driven member rotatably mounted on the screw shaft. In juxtaposition with the driven member is a slip clutch also mounted on the shaft, and bearing against the driven member in an axially thrusting relationship. In a preferred embodiment, the mechanism is a two-speed axle shifter which includes a rotatably mounted driven spur gear on a screw shaft, with a slip clutch defined by a Belleville spring positioned in an axially thrusting frictional engagement with the gear. A reversible electric motor having a drive pinion engaged with the rotatably mounted driven spur gear, rotates the screw shaft, whereby a travelling nut is reciprocally moved along the shaft. The screw shaft includes stops thereon for instantaneously arresting the travelling nut at each end of the shaft. The impact load created thereby is absorbed by the slip clutch, thus greatly enhancing the life of the screw shaft.

7 Claims, 4 Drawing Figures

SLIP CLUTCH SPEED CHANGE MECHANISM

BACKGROUND

This invention relates to mechanisms for changing gear speed ratios between selective values. More particularly, this invention relates to speed change mechanisms including gear shift yokes actuated by travelling nuts on screw shafts.

Prior art devices of the type referenced herein are subject to frequent failures resulting from premature wear. Such devices utilize nuts which contain rolling balls juxtaposed between the nut body and grooves of the screw shaft. The balls allow for a slight and desirable amount of overrunning of the nut at the ends of stroke travel. However, the balls tend to make point (rather than surface) contact with the grooves of the screw shaft resulting in accelerated or premature wear of both balls and shaft. As the balls decrease in size, contact stresses become even greater. Further deterioration results in failure of the screw assembly to traverse, which is ultimately followed by motor failure.

SUMMARY OF THE INVENTION

The invention disclosed herein operates to relieve screw shaft loading as imposed by aforesaid balls during overrunning of the shaft. The invention avoids such contact stresses by actual elimination of the balls, as made possible by provision of a slip clutch in the screw shaft drive mechanism. A simple nut and screw shaft is employed, instead of a ball containing nut, in which surface rather then point contact is achieved between nut and screw shaft. This along with a slip clutch avoids the premature wear heretofore described.

A preferred embodiment of this invention is employed in a two-speed axle shifter, wherein the screw shaft thereof supports a rotatably mounted driven spur gear positioned in frictional, axially thrusting engagement with a slip clutch also mounted on the shaft, the clutch defined by a Belleville spring. The nut is reciprocally moved along on the shaft, as the shaft is rotated through the slip clutch via reversible electric motor. The mechanism allows slippage between the clutch and spur gear only during the overrunning mode, thus only after the nut has been instantaneously arrested by keys on the shaft. By absorbing the inertial energies of the rotating masses, the slip clutch speed change mechanism hereof provides for significant reduction of impact loading on the screw shaft, and thus minimizes the screw deterioration otherwise incurred during the overruning mode of a ball nut system.

DETAILED DESCRIPTION OF A PREFERRED EMBODIMENT

Figure 1:
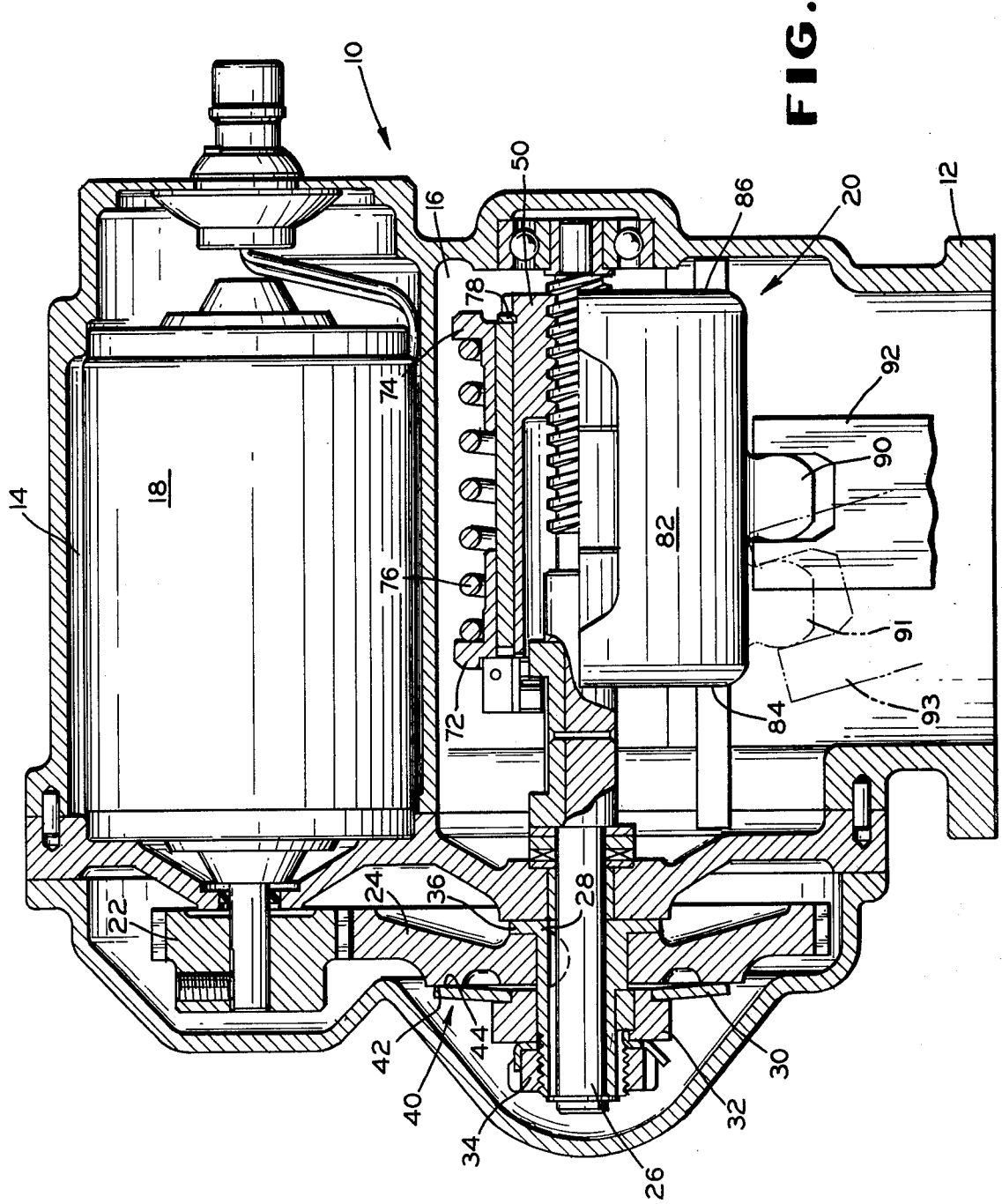
FIG. 1 is a cross sectional view of a preferred embodiment of the speed change mechanism of this invention.

A preferred embodiment of the slip clutch speed change mechanism 10 is shown in FIG. 1. The mechanism 10 includes a housing 12, which defines upper and lower compartments 14 and 16, respectively. The upper compartment 14 contains an electric reversible motor 18, while the lower compartment houses the shifter mechanism 20, as will be described.

Figure 2:
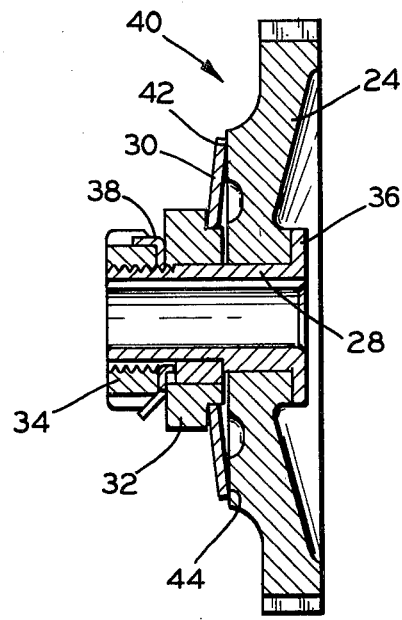
FIG. 2 is a cross sectional view of the slip clutch elements employed in the speed change mechanism of FIG. 1.

The electric motor 18 rotates a motor drive gear 22, which is in constant mesh with a shifter driven gear 24. The driven gear 24 is rotatably piloted on a thrust bearing or bushing 28, which is positioned on a screw shaft 26. Also positioned on the screw shaft 26 is a slip clutch 30, preferably a Belleville spring, piloted on a thrust bearing or bushing 32. The driven gear 24 and slip clutch 30 bear against each other axially, in a thrusting relationship. Referring to FIG. 2, the gear 24 and clutch 30 form a slip clutch assembly 40 as shown in isolated detail. The gear 24 and clutch 30 bear against one another at face engaging portions 42 and 44, respectively. The thrust force between them may be varied by adjustment of a lock nut 34 to produce optimal frictional torque characteristics, as will be appreciated by those skilled in the art. It will be noted in this connection that an adjustment of the lock nut 34 will result in a change of spring tension in the clutch 30, which will effect either an increase or decrease in the axial reaction force on the flange 36 of the bearing 28. Between the lock nut 34 and the clutch bushing 32 is a lock washer 38 which is keyed to the bushing 28 for axial movement only therealong, and thus is restrained from rotation thereabout. Use of the lockwasher 38 prevents undesirable rotation of the lock nut 34 by virtue of vibration or any other undesirable torque load imposed on the nut 34 by the clutch 30.

Figure 3:
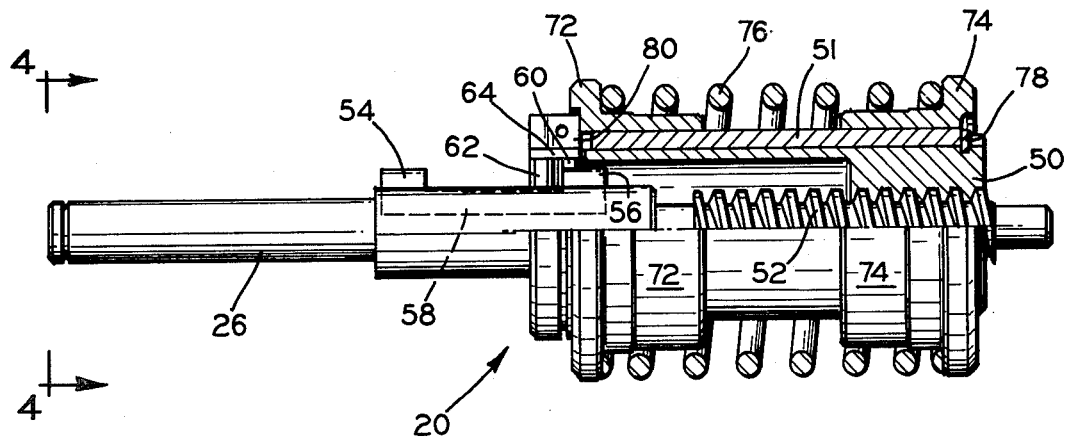
FIG. 3 is a side view partly in section of the nut and screw shaft elements of the speed change mechanism of FIG. 1.
Figure 4:
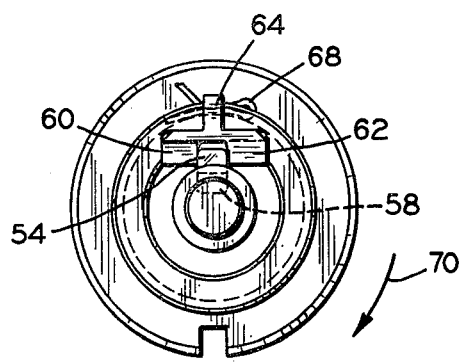
FIG. 4 is an end view of the nut and screw shaft along lines 4—4 of FIG. 3.

The shifter mechanism 20 of the slip clutch speed change mechanism 10 is shown in isolated detail in FIGS. 3 and 4. The nut 50 is restrained from rotational movement on the screw shaft 26 by a key 51, and is limited in its reciprocal motion along the screw shaft 26 by limit stops 54 and 56. In the preferred embodiment, the limit stops 54 and 56 form parts of a single unitary structure 58, the body of which is keyed into the shaft 26 as shown more clearly in FIG. 3. The nut 50 includes a set of impact lugs 60 and 62 which are also parts of a unitary structure 64 in the preferred embodiment, more clearly shown in FIG. 4. The structure 64 may be integral with the nut 26, or as more conveniently employed herein, may be a separate structure affixed to the nut via means such as the key and cotterpin combination 68 shown. It will be noted that the limit stop 56 will contact the impact lug 60, when the nut 50 is in the extreme rightward position on the threaded portion 52 of the shaft 26, while the limit stop 54 will contact the impact lug 62 in the extreme leftward position of the nut 50 on the threaded portion 52. In urging the nut 50 leftwardly from the extreme rightward position shown, the screw shaft 26 will turn in the direction of the arrow 70 (FIG. 4).

As mentioned, the nut 50 is restrained from rotation about the rotating screw shaft 26 by a key 51. The key 51 is anchored into a pair of annular spring slide members 72 and 74 positioned radially outwardly of the nut 50. The slide members saddle a pre-load shifter spring 76, which is under constant compression between them, the spring urging the slide members axially apart. A snap ring 78 on the rightward end of the nut 50 restrains the slide member 74 from sliding off of the right end of the nut, while an integral flange 80 retains the slide member 72, from sliding off of the left end. The use of the snap ring at one end facilitates assembly, wherein the slide members 72,74, and spring 76 are first inserted over the nut against the flange 80 under compression, the snap ring then inserted to permanently retain the latter members in place.

Positioned radially outwardly of the slide members 72, 74 and spring 76, is a shifter cradle 82 (FIG. 1) to which the slide members 72 and 74 are keyed. The cradle 82 is, in turn, keyed to the housing 12. The described system of keys, as will now be appreciated by those skilled in the art, defines the mechanism herein employed for restraining the nut 50 against rotation.

The shifter cradle 82 has a semi-circular cross-section; in the preferred embodiment it occupies only the lower half portion of the shifter mechanism 20 and includes a boss 90 (FIG. 1) which engages a shifter fork 92. The lower halves of the annular slidemembers 72, 74 are contained within the radially extending ends 84 and 86 of the cradle 82.

The operation of the slip clutch speed change mechanism may now be described. Referring to FIG. 1, the reversible electric motor 18 is actuated, for example by a two-position switch in the cab of a truck or other vehicle. The motor 18 then turns the drive gear 22, which in turn rotates the driven gear 24, and via the slip clutch 30, the screw shaft 26 is rotated. The reciprocally moveable nut 50 is thereby driven from either the right or left hand stroke limit on the shaft to the opposite limit. Thus, starting from the rightward position shown in FIGS. 1 and 3, the non-rotating nut 50 is driven leftwardly by the screw shaft (rotating clockwise in the direction of the arrow 70 in FIG. 4), until the limit stop 54 which rotates with the shaft strikes the impact lug 62 of the nut (FIGS. 3 and 4). Upon making striking contact thereof, the drive torque friction between the gear 24 and slip clutch 30 is instantaneously exceeded, and the inertial energies of the rotating gear and motor masses is thereupon dissipated as heat energy while the gear 24 momentarily continues to rotate against the suddenly stopped clutch 30 as the motor 18 becomes stalled. The use of a timing switch for the motor 18 is preferred for the avoidance of lengthy motor stalls.

Alternatively, the clutch 30 may continue to rotate with the gear 24, but slip relatively to the bushing 32. This is not the preferred friction arrangement however, as the greater contact area and torque leverage afforded between the gear 24 and clutch 30 provide advantages as to both the durability and sizing of the friction parts.

As earlier mentioned, the shifter mechanism 20 includes a pre-load shifter spring 76. Thus it is possible, in this preferred embodiment, to make a pre-selection of a shift that momentarily cannot be made, as for example while the gear train is under load in a two-speed axle shifter. Spring energy may be stored for completing such a shift at such time that the load is later relieved, as will be understood by those skilled in the art.

Assuming a pre-load shift of the nut 50 to the left (to the position of phantom boss and shift fork, 91 and 93) from the rightward position as shown in FIG. 1, the nut will be moved leftwardly until the leftward limit is reached, as aforedescribed. As the nut 50 moves leftwardly, the snap ring 78 will assure simultaneously leftward movement of the right slide member 74, which in turn will compress the spring 76 against the left slide member 72. The left slide member 72 will be restrained from any leftward movement by virtue of the left radially extending end 84 of the cradle 82 previously described. The cradle 82, and hence boss 90, will be restricted from actual leftward movement while the gear train is loaded, and energy for the actual shift will simply be stored in the spring until the load is relieved. If, however, no load is on the gear train at the time of shift, the cradle 82 will move simultaneously leftwardly with the leftward movement of the nut 50, without any pre-loading of the spring 76. Return or rightward movement of the nut will result in similar but oppositely described movement of the parts, with the exception that the flange 80 and right end 86 will replace the functions of the snap ring 78 and left end 84, respectively.

The foregoing description represents only one of many possible embodiments of this invention as claimed hereunder.

1. In a speed change mechanism comprising a travelling nut and a screw shaft drivably supporting said nut, a driven member rotatably journaled on said shaft, and a slip clutch mounted on said shaft, said clutch in axially thrusting frictional engagement with said driven member; an improvement comprising a pair of opposed annular slide members, a spring under constant compression interposed between said slide members, and retention means on said nut for axially restraining said slide members over said nut under force of said spring.

2. The speed change mechanism of claim 1, further comprising motive means in engagement with said driven member, whereby said driven member rotatably actuates said screw shaft via said slip clutch, thereby urging said travelling nut along said shaft.

3. The speed change mechanism of claim 2 in which said motive means are reversible whereby said driven member rotates bi-directionally and said nut is reciprocally moved along said shaft.

4. The speed change mechanism of claim 3, wherein said slip clutch comprises means for adjusting friction between said clutch and said driven member.

5. The speed change mechanism of claim 4, wherein said slip clutch comprises a Belleville spring mounted on said screw shaft, wherein said driven member comprises a driven spur gear rotatably journaled on said shaft.

6. The speed change mechanism of claim 5, wherein said means for adjusting friction between said clutch and said driven member comprises an adjusting lock-nut mounted at one end of said screw shaft.

7. The speed change mechanism of claim 6, wherein said nut comprises means disposed thereon for engagement with an actuator yoke for alternately selecting between two axle speed positions.

* * * * *